United States Patent [19]

Wagner et al.

[11] Patent Number: 5,119,718
[45] Date of Patent: Jun. 9, 1992

[54] VENTILATING ARRANGEMENT FOR THE CAB OF A VEHICLE

[75] Inventors: Jurgen Wagner, Darmstadt; Michael Teich, Mannheim, both of Fed. Rep. of Germany

[73] Assignee: Deere & Company, Moline, Ill.

[21] Appl. No.: 640,442

[22] Filed: Jan. 11, 1991

[30] Foreign Application Priority Data

Jan. 17, 1990 [DE] Fed. Rep. of Germany ....... 4001148

[51] Int. Cl.$^5$ .............................................. B60H 3/06
[52] U.S. Cl. ..................................... 454/158; 55/433; 296/208; 454/136
[58] Field of Search ....................... 98/2.11, 2.14, 2.15, 98/2.05, 2.06, 115; 55/495, 508, 515, 320, 432, 433; 296/190, 208, 180.2

[56] References Cited

U.S. PATENT DOCUMENTS

| | | | |
|---|---|---|---|
| 1,270,147 | 6/1918 | Gollinge | 55/432 |
| 3,792,569 | 2/1974 | Carlson et al. | 55/433 |
| 3,868,896 | 3/1975 | Doll et al. | 98/2.11 |
| 4,221,274 | 9/1980 | Martin, Jr. | 296/190 |
| 4,518,195 | 5/1985 | Tindall et al. | 296/190 |
| 4,612,975 | 9/1986 | Ikari | 98/2.11 |

FOREIGN PATENT DOCUMENTS 1151486  4/1985  U.S.S.R. ................... 98/25

Primary Examiner—Albert J. Makay
Assistant Examiner—William C. Doerrler

[57] ABSTRACT

A ventilating arrangement for a vehicle cab draws air in from outside the cab through the cab roof. The air flows through at least one generally vertical air duct downward to the vicinity of the cab floor, and supplied from there to various outlets in the interior of the cab. In order to allow use of air filters with relatively large filter area and as convenient accessibility for easy replacement, a filter housing is connected to the lower region of each generally vertical air duct. Each filter housing encloses an air filter that is accessible from the exterior of the cab. The filter is oriented in a generally vertical direction. Preferably, each corner post of the cab is provided with an air duct which is connected to a filter housing attached to the inner fenders of the rear wheels. Each filter housing is closed by a removable cover accessible from the rear of the vehicle.

15 Claims, 4 Drawing Sheets

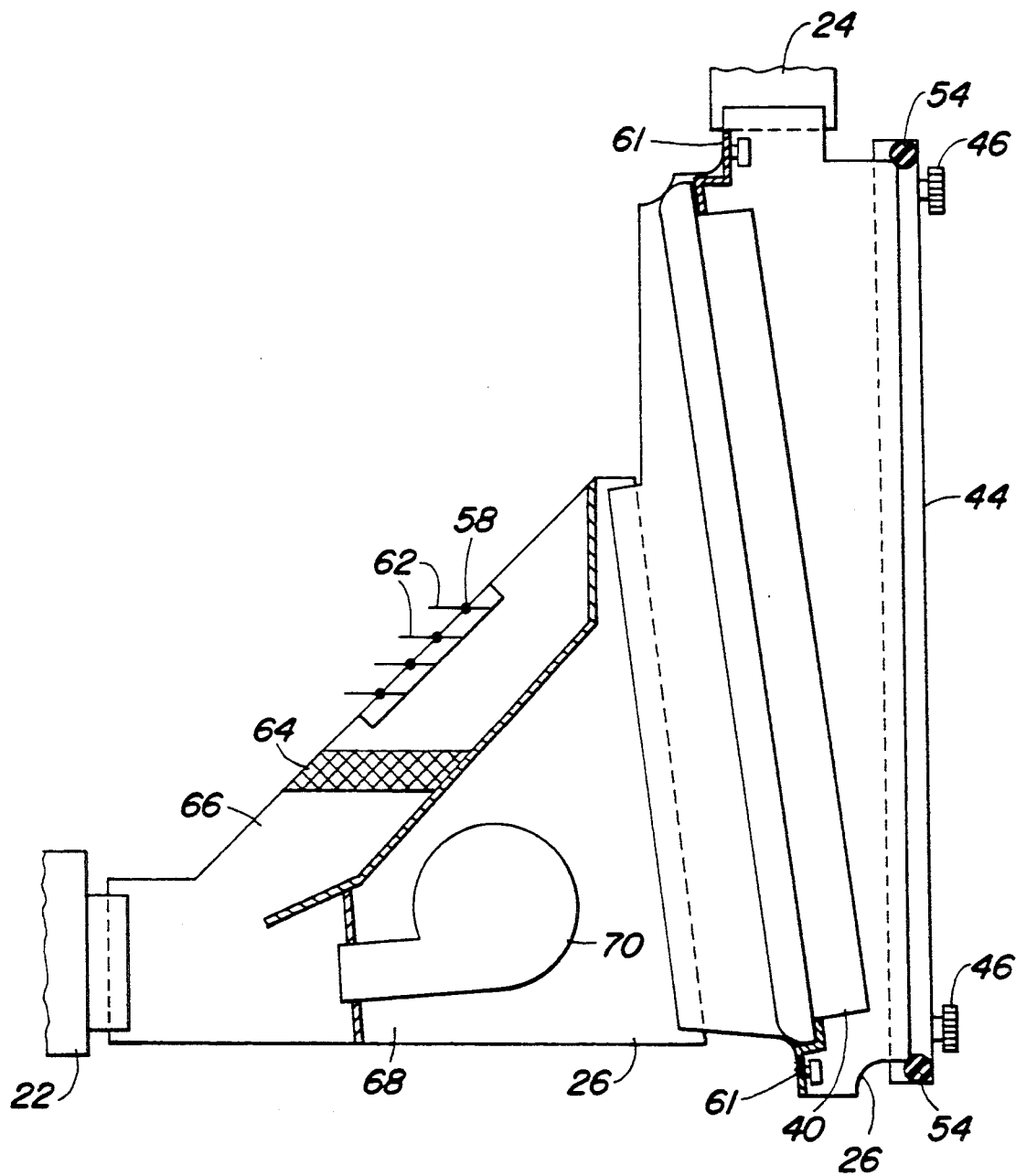
FIG. 4
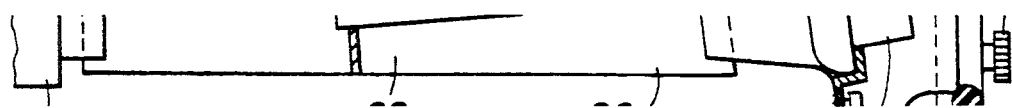

VENTILATING ARRANGEMENT FOR THE CAB OF A VEHICLE

BACKGROUND OF THE INVENTION

1. Field of the Invention

The invention concerns a ventilating arrangement for the cab of a vehicle, in which the air is taken in from the outside in the region of the roof, conducted downward through at least one generally vertical air duct to the region of the cab floor, and supplied from there to various outlets in the interior of the cab. A preferred application is for agricultural vehicles, in particular for tractors.

2. Description of the Related Art

European Patent Specification 0 042 597 shows a ventilating arrangement in which fresh air is sucked in by a blower through two vertical ducts. The blower is located near the floor of the operator's cab. An air filter between the blower and the inlet cleans the intake air. Although not described in detail by EP 0 042 597, the space requirement in the vehicle interior is relatively small. The filter is also relatively small, and hence imposes a relatively high resistance to air flow. The filter is accessible from the interior of the cab, and can be replaced. However, due to the tight conditions in the cab, the filters are not easily accessible, making replacement difficult. Furthermore, during replacement dust and particles built up on the filter can get into the vehicle cab, and contaminate it.

SUMMARY OF THE INVENTION

The object of the invention is to provide a ventilating arrangement: the aforementioned type, but which allows the use of filters with a relatively large filter area, and which provides easy access for the replacement of the filters, thereby avoiding any contamination of the vehicle cab. In addition, it is desirable to position the filter housings so that they do not interfere with visibility directly behind the tractor cab, since the operator needs to be able to see the hitch which typically is located there.

This object is achieved according to the invention by providing a filter housing in the lower region of each generally vertical air duct, with at least one air filter accessible from the exterior of the cab. The filter housings are mounted at the sides of the cab, and do not extend across the back of the cab.

Such a design will assure easy accessibility and hence simple replacement of the filter. Dust and dirt from the filter housing cannot get into the interior of the cab during filter replacement. With appropriate location of the filter housing, filter service can be accomplished from the ground. Since the periphery of the cab provides a relatively large space, the filter housing can be designed to be relatively large, thereby accommodating a filter with a large filter area.

In addition, by mounting the filters on the sides, without extending across the back of the cab, visibility directly behind the cab is unimpeded.

Preferably, a generally vertical air duct is provided in or adjacent to each side rear corner post of the cab, and each has a filter housing attached at its lower end. It is particularly advantageous for the generally vertical air ducts to be formed as sheathing for the corner posts.

The filter housing may conveniently be arranged generally at the sides of the cab and behind the operator's seat, with the air filter(s) accessible from the rear of the vehicle. This arrangement will reduce visibility only slightly or not at all. Arrangement of the filter housings at the rear sides of the cab also permits good access to the filters.

Each filter housing is appropriately closed by a housing cover that can be opened from the outside of the vehicle. This housing cover preferably is oriented vertically. It may be, for example, a removable, generally rectangular cover, which can be attached to the filter housing by four screws or other quick-release fasteners. The cover may also be connected to the filter housing by a hinge.

According to a preferred embodiment of the invention, the air filter is attached to the housing cover. The attachment mechanism may use clips, clamps, screws or an interference fit. The filter then can be removed easily together with the cover from the filter housing. In this configuration, the cover and filter assembly perform a dual sealing function. For one, the cover seals the filter housing towards the outside; for the other, the filter provides a circumferential seal that is in contact with the interior of the filter housing and prevents air from flowing around the filter. The first seal preferably is extremely soft and is arranged to "float". This assures sealing effectiveness for the latter seal.

Alternatively, the air filter can be mounted in the filter housing, becoming accessible upon removal of the cover.

The filter may be a common paper filter that filters out dust, or it may be an appropriate toxic materials filter to remove pollution.

It is advantageous for the filter to be generally arranged vertically. Air enters the filer housing from above on one side of the filter, and leaves it below on the other side of the filter. Thus, the flow passes diagonally through a mostly vertical filter from above rear towards the bottom front. Thanks to the vertical arrangement of the filter, the filter housing can be relatively narrow, requiring little space. To optimize the flow and to conform to the frame arrangement of the cab, the filter is preferably inclined towards the front by about 5°, so that the upper edge of the filter is slightly forward of the lower edge. The arrangement may, however, be modified so that the lower edge of the filter is further forward. This improves the self-cleaning effect of the filter.

The generally vertical filter housing cover preferably is provided with a bulge widening toward the bottom, in which dust and dirt can accumulate without clogging the filter. A closable opening can be provided at the bottom of the filter housing or the filter housing cover, through which dust and dirt can be released from the filter housing. The opening may be closed, for example, by a conical plug, a hinged flap or the like, which is pressed against the opening by spring force. It is also possible to arrange a sliding drawer under the opening into which the dust and dirt can fall. This allows simple intermediate service, without requiring removal of the filter housing cover or the use of any tools, and extends the periodic maintenance interval for the filters.

In a further embodiment of the invention, a lower side air duct is connected to the downstream side of the filter housing, which leads to a climate control unit located below the operator's seat. The climate control unit provides ventilation (main blower), heating (heat exchanger) and if required, cooling (air conditioning unit with evaporator) for the cab interior. It may also include a device to control humidity (dehumidifier). This arrangement of the climate control unit beneath the operator seat saves space.

In addition to the intake of fresh air into the vehicle cab, part of the cab air may be recirculated. This can save heating or cooling energy and yet makes an adequate air flow in the cab possible. For this purpose, it is advantageous to provide air inlets for cab air recirculation in the filter housing downstream of the filter or in the air duct attached to the filter housing. It is also possible to provide inlets for the recirculated air ahead of the filter. These air inlets are preferably provided with controllable flaps to permit adjustment of the proportion of fresh air to recirculated air.

The air ducts and the filter housing preferably consist of thermoplastic produced by glass fiber molding methods or injection molded. Furthermore, the components of the air duct system, including the ducts in the cab roof, the vertical air ducts, the filter housings and the air ducts attached to it, are preferably provided with sleeve connections that can be slid into one another. This simplifies assembly and assures good sealing of the connections between the individual duct sections.

BRIEF DESCRIPTION OF THE DRAWINGS

The invention, its advantages and further advantageous developments shall be described and explained in greater detail below with reference to the following drawings:

FIG. 4 is a side view in partial section of the ventilating arrangement according to a second embodiment of the invention.

DETAILED DESCRIPTION OF THE PREFERRED EMBODIMENTS

Figure 1:
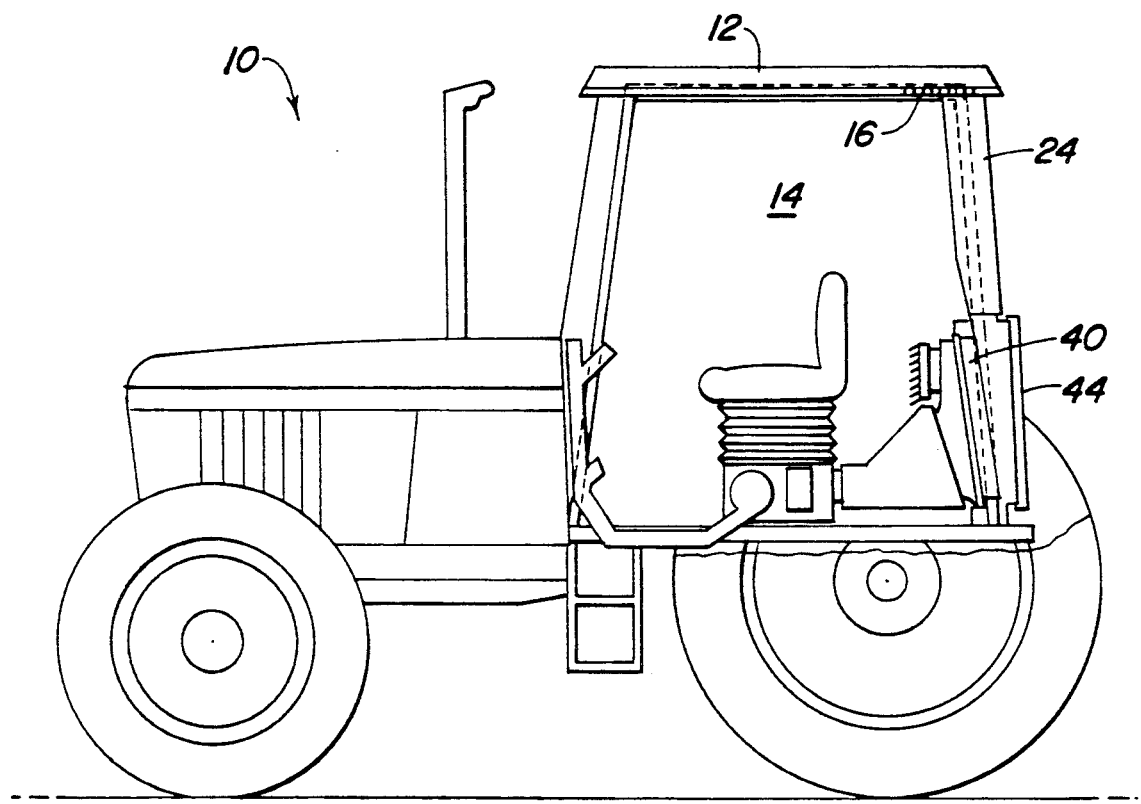
FIG. 1 is a side view of an agricultural tractor with a vehicle cab equipped with a ventilating arrangement according to the invention.

Referring to FIG. 1, an agricultural tractor 10 is equipped with a vehicle cab 12 that encloses a space 14 for the operator. Fresh air is taken from outside into the vehicle cab 12 through a number of air intake slots 16 located along both sides of roof of the vehicle cab 12.

Figure 2:
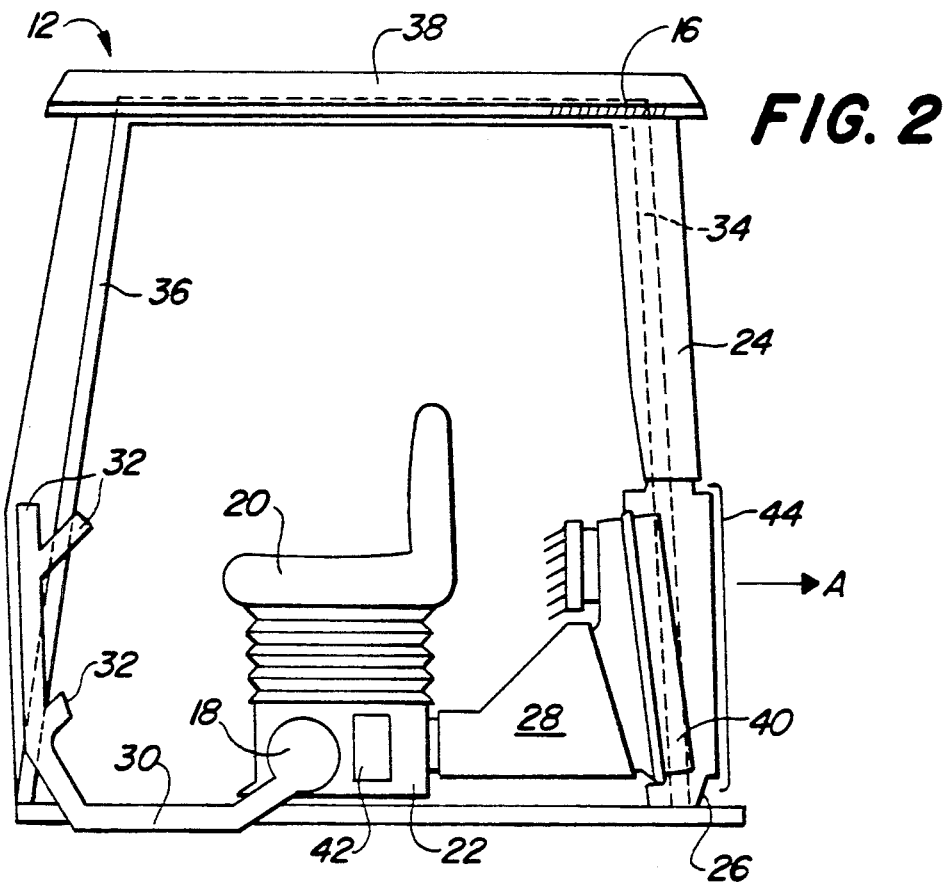
FIG. 2 is a side view in partial section of the vehicle cab of FIG. 1.
Figure 5:
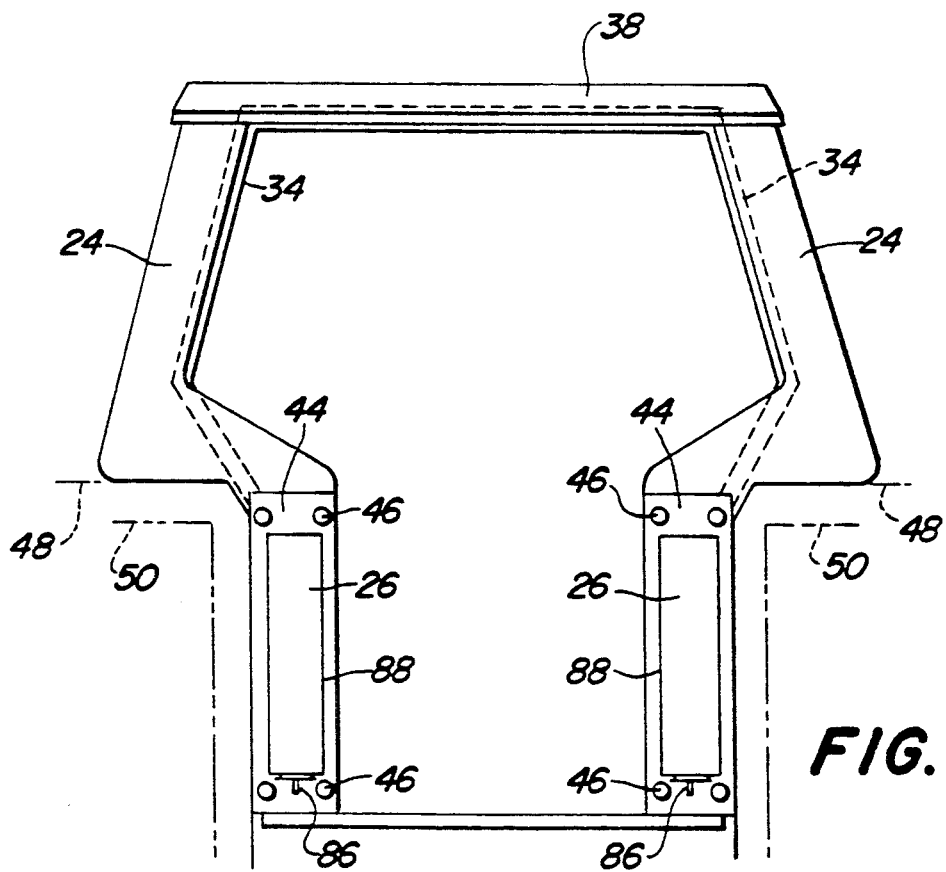
FIG. 5 is a schematic rear view of a vehicle cab.

As shown in more detail in FIG. 2, the fresh air is sucked in by a main blower 18, located in a climate control unit 22 below the operator's seat 20. The fresh air is drawn from the air intake slots 16 through substantially vertical air ducts 24, filter housings 26 (one housing on each side, as shown in FIG. 5), and lower air ducts 28 into the climate control unit 22. From the main blower 18, the air is conducted through additional air ducts 30 to various air outlets 32.

The vertical air ducts 24 are located in the area of the rear corner posts 34 at each side, which, together with the forward corner posts 36, form the cab frame and support the cab roof 38. The vertical air ducts 24 preferably serve as sheathing for the corner posts 34.

Behind the operator's seat 20, the vertical air ducts 24 are connected at their lower ends to the filter housings 26. Each filter housing 26 accommodates an air filter 40 through which fresh air flows from above rear to lower front. Each filter housing 26 is connected to a lower side air duct 28, through which the air can reach the climate control unit 22. The climate control unit 22 is located beneath the operator's seat 20 and contains a main blower 18 and a heat exchanger 42 which are shown only schematically. In addition, the climate control unit 22 may contain a cooling system as well as a dehumidifier.

The individual components through which the fresh air flows, namely, the vertical air ducts 24, the filter housings 26, the lower air duct 28 and the climate control unit 22, are provided with connections that can be inserted into each other, so as to assure easy assembly and good sealing of the joints between the individual duct segments. These components may be made from a material such as a thermoplastic resin using glass fiber molding.

As shown in FIG. 5, the rear corner posts 34 form the cab frame and are designed as rollover protection bars. The vertical air ducts 24 are attached externally to the rear cab corner posts 34 and lead from the cab roof 38 to the filter housings 26. The filter housings 26 are each closed by a generally rectangular cover 44. Each cover is attached to the filter housing 26 by four screws 46. The covers are oriented generally in a vertical direction and are accessible from the rear of the vehicle. To replace the filter, the attaching screws 46 are removed and the cover 44 taken off (in direction of the arrow "A" in FIG. 2). The filter housings 26 preferably are mounted on the inner side of the fenders 48, which partly cover the rear wheels 50. It should be noted that the filter housings 26 do not extend across the back of the back, so that visibility directly behind the cab (e.g., to the tractor hitch) is unimpeded.

Figure 3:
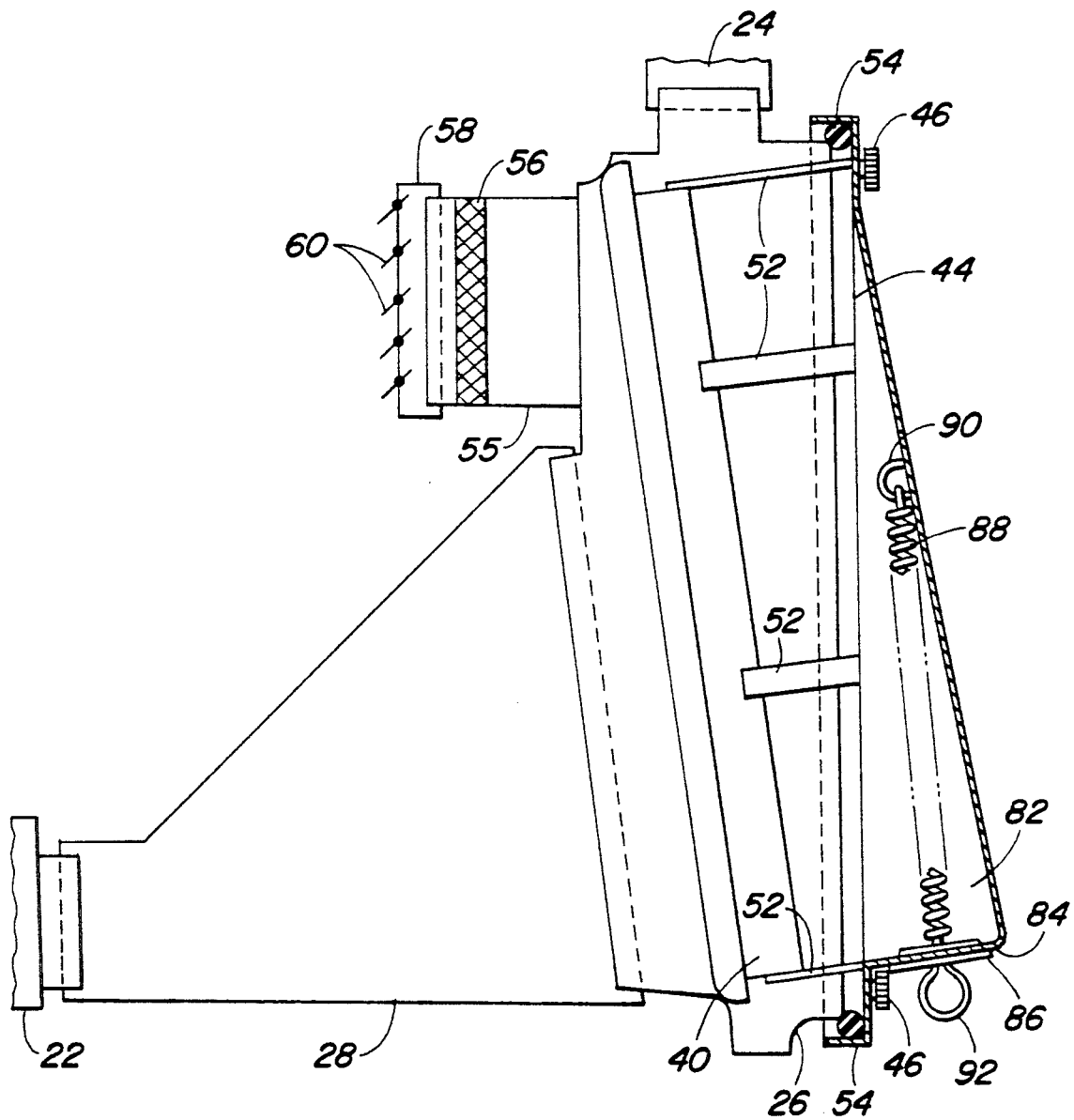
FIG. 3 is a side view of a portion of the ventilating arrangement according to a first embodiment of the invention.

FIG. 3 shows an air filter arrangement in which the air filter 40 is mounted to the cover 44 by brackets 52. The air filter 40 may be held to the brackets 52 by means such as clamping, detents or screws. The downstream edge of the air filter 40 is in sealing contact with the air filter housing 26 so that no fresh air can reach the climate control unit 22 without going through the filter 40. The periphery of the cover 44 is provided with a seal 54 by means of which the cover 44 is sealed against the filter housing 26, so that no air can either enter or leave the air duct in the area of the cover 44.

A stub duct 55 is provided downstream of the filter 40 in the filter housing 26. The stub duct 55 contains a recirculated air filter 56 and carries a flap arrangement 58. Movement of the flaps 60 permits adjustment of the amount of recirculated air that is mixed with the fresh air. By appropriate control of the flow of recirculated air, heating or cooling energy can be saved.

As shown in FIG. 3, the flange surface of the cover 44 is oriented generally in the vertical direction. The central part of the cover 44 is provided with an outwardly directed bulge 80. The bulge 80 widens from the top, where it begins to diverge from the flange surface of the housing cover, towards the bottom, so that a plenum 82 is formed towards the bottom. Dust held back by the air filter 40 can accumulate in this plenum 82, without clogging the air filter 40. The plenum 82 thereby permits longer maintenance intervals.

An opening is provided in the bottom 84 of the bulge 80 and is covered by a closure 86. The closure 86 shown is configured as a conical, self-centering plug attached to one end of a helical spring 88. The other end of the helical spring 88 engages a hook 90 in the upper region of the bulge 80 on the inner side of the housing cover 44. The helical spring 88 is so designed that it draws the plug from the outside against the opening in the bottom 84. An eye 92 is provided on the outer side of the plug 86 by means of which the plug can be pulled manually downward against the force of the helical spring 88, exposing the opening and allowing the dust to fall out. Since the opening leads to the outside, the dust that falls out cannot reach the interior of the vehicle cab 12.

Accordingly, opening the plug and the emptying of the plenum 82 requires no tools. Dirt that has been baked into a solid deposit can be dislodged by stretching the spring 88 and using a "stirring" motion. Stubborn dirt accumulations can also be removed by pulling out the plug and letting it snap back. The arrangement of the bulge 80 and the plug 86 allow for a rapid, simple intermediate service that removes dirt without the necessity of opening the filter housing cover 44. The maintenance intervals for a thorough filter service can thereby be increased considerably.

An alternative air filter arrangement is shown in FIG. 4. Here, the air filter 40 is mounted inside the filter housing 26 by clamps 61. Alternatively, the filter 40 may be mounted in the filter housing 26 by detents or an interference fit. Removal of the cover 44 from the filter housing 26 in this embodiment does not simultaneously remove the air filter 40 from the filter housing 26, as is the case with the arrangement according to FIG. 3. Instead, additional attaching means 61 must be released in order to remove the air filter 40.

The structure for mixing recirculated air with the fresh air according to FIG. 4 also differs from that according to FIG. 3. According to FIG. 4, the recirculated air is sucked in by the main blower 18 through a flap arrangement 62 and a recirculated air filter 64. A supplementary blower 70 is located in the fresh air duct 68 upstream of the entry point of the recirculated air. The supplementary blower 70 assures a constant flow of fresh air into the vehicle cab 12. Adjustment of the flap arrangement 62 controls the amount of recirculated air.

While the present invention has been described in conjunction with a specific embodiment, it should be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A ventilating system for a tractor cab having an operator seat therein, a roof at the top thereof and at least one rear cab corner post on a tractor having a fender adjacent to said at least one rear cab corner post, the system comprising:
   at least one air intake in the vicinity of the roof of said cab;
   a substantially vertically extending air channel connected to said at least one air intake and running along said at least one rear cab corner post from said roof toward the bottom of said cab;
   a filter housing adjacent to said fender and behind said operator seat, said filter housing being connected to the lower portion of said air channel and containing at least one air filter element, said filter housing further being provided with a removable filter housing cover at the outside rear of the housing, said cover allowing access to said filter element from the outside rear of said cab.

2. The ventilating system of claim 1, further comprising mounting means for mounting said filter to said filter housing cover, so that said filter is removed from said housing whenever said filter housing cover is removed from said housing.

3. The ventilating system of claim 1, further comprising mounting means for mounting said filter in said filter housing independently of said filter housing cover.

4. The ventilating system of claim 1, wherein two of said air channels are provided, one along each rear corner post of said cab, and wherein two filter housings are provided, one adjacent to the lower end of each of said two air channels.

5. The ventilating system of claim 4, wherein said filter housings do not extend significantly across the back of said cab, so that said filter housings do not interfere with visibility directly behind the cab.

6. The ventilating system of claim 1, wherein said air filter is selected from the group consisting of dust filters and toxic materials filters.

7. The ventilating system of claim 1, wherein said air filter is oriented in a substantially vertical direction, and wherein the air flow through it is generally diagonal from above rear to bottom front.

8. The ventilating system according to claim 7, wherein the filter surface of the air filter is inclined to the vertical at an angle of approximately 5°, with the upper edge of the filter closer to the front of the cab.

9. The ventilating system according to claim 1, further comprising a climate control unit located substantially beneath the operator's seat and connected to the downstream side of said filter housing.

10. The ventilating system of claim 9, further comprising recirculated air inlets located downstream of said air filter and upstream of said climate control system.

11. The ventilating system of claim 10, wherein said climate control system includes a main blower and further comprising a supplemental blower upstream of said recirculated air inlets and downstream of said filter housing.

12. The ventilating system of claim 1, wherein said air channel also serves as sheathing for said rear cab post.

13. The ventilating system of claim 1, wherein said housing cover is provided with a bulge widening towards the bottom of the cover to retain dust and dirt.

14. The ventilating system of claim 13, wherein said housing cover is provided with an opening for allowing removal of said retained dust and dirt, and further comprising a closure for selective closing said opening.

15. The ventilating system of claim 14, further comprising a spring attached between said closure and the inside of said filter housing or said filter housing cover for biasing said closure into a position closing said opening.

* * * * *